United States Patent [19]
Nelson et al.

[11] Patent Number: 6,012,482
[45] Date of Patent: Jan. 11, 2000

[54] LINE BREAK DETECTOR FOR PRESSURIZED FLUID PUMPING SYSTEMS

[75] Inventors: Thomas J. Nelson, St. Anthony; John C. Buysse, Minneapolis, both of Minn.; David E. Jones, Brighton, Ill.

[73] Assignee: DJT Products, Inc., St. Anthony, Minn.

[21] Appl. No.: 09/016,744

[22] Filed: Jan. 30, 1998

Related U.S. Application Data

[60] Provisional application No. 60/036,334, Jan. 30, 1997, provisional application No. 60/040,886, Feb. 12, 1997, provisional application No. 60/045,678, May 6, 1997, and provisional application No. 60/057,357, Aug. 25, 1997.

[51] Int. Cl.$^7$ .................................................. F16K 31/12
[52] U.S. Cl. ...................................... 137/492.5; 137/488
[58] Field of Search ........................ 137/456, 492.5, 137/492, 464, 465, 458, 572, 488; 251/29; 73/40.5 R

[56] References Cited

U.S. PATENT DOCUMENTS

| | | |
|---|---|---|
| 3,742,970 | 7/1973 | Gross . |
| 3,771,543 | 11/1973 | Wiggins . |
| 3,776,249 | 12/1973 | Wailes et al. . |
| 3,823,729 | 7/1974 | Swogger . |
| 4,004,607 | 1/1977 | Freese . |
| 4,017,053 | 4/1977 | Wells et al. ........................ 137/458 X |
| 4,051,715 | 10/1977 | Ledeen et al. ..................... 137/456 X |
| 4,074,692 | 2/1978 | Shafer . |
| 4,145,025 | 3/1979 | Bergeron ............................ 137/456 X |
| 4,355,654 | 10/1982 | Levesque et al. . |
| 4,507,128 | 3/1985 | Werner . |
| 4,732,190 | 3/1988 | Polselli . |
| 4,807,661 | 2/1989 | Lewis et al. . |
| 5,568,825 | 10/1996 | Faulk . |

*Primary Examiner*—Denise L. Ferensic
*Assistant Examiner*—Joanne Y. Kim
*Attorney, Agent, or Firm*—Patterson & Keough, P.A.

[57] ABSTRACT

A linear mechanical line break detector for use on a mobile transport, the mobile transport having a supplying vessel disposed thereon for transporting a fluid product, the vessel having an outlet for transferring fluid product from the supplying vessel, the flow of fluid product from the outlet being controlled by a fluid product shut off valve, the outlet being coupled to a transfer line during transfer of fluid product under pressure from the supplying vessel to a receiving vessel, the transfer line being coupled to the receiving vessel for effecting transfer of the fluid product to the receiving vessel, includes a sensor/actuator that is in fluid communication with the transfer line for sensing the pressure of the fluid product therein. A valve actuator has a set disposition related to a set disposition pressure and has a trip disposition related to a trip disposition pressure, a selectable pressure differential being defined between the set disposition pressure and the trip disposition pressure, the valve actuator being operably coupled to the sensor/actuator for actuation thereby to the set disposition.

23 Claims, 11 Drawing Sheets

LINE BREAK DETECTOR FOR PRESSURIZED FLUID PUMPING SYSTEMS

RELATED APPLICATIONS

This application claims the benefit of U.S. Provisional Application Nos. 60/036,334 filed Jan. 30, 1997, 60/040,886 filed Feb. 12, 1997, 60/045,678 filed May 6, 1997, and 60/057,357 filed Aug. 25, 1997.

FIELD OF THE INVENTION

This invention relates generally to safety devices for fluid product storage and transfer systems for mobile MC330 and MC331 transports and stationary fluid storage tanks and related systems. More particularly it is related to a line break detection device that senses pressure at a single point in the fluid pressure line leading from the supplying vessel to the receiving vessel.

BACKGROUND OF THE INVENTION

On Sep. 8, 1996 a propane transport tanker filled with 9,000 gallons of liquid propane was delivering product to a bulk storage tank system. During the delivery, the line used to transfer the liquid propane from the transport trailer to the storage tanks failed. This allowed liquid propane to escape in an uncontrolled manor. The existing safety valve, called an excess flow valve, located at the discharge port of the MC330/MC331 class tanker, failed to close because not enough differential pressure between the transport tank vessel and the discharge line directly downstream of the excess flow valve existed to close the valve. Propane fluid flowed past the excess flow valve, and across the product pump pumping mechanism into the severed line.

Because propane fluid expands at a rate of approximately 400% when it reaches the atmosphere, the severed hose moved in a fast and uncontrollable motion. The transport truck and trailer were parked in such a way that the operator could not reach the manual shutoff valves located at opposite ends of the trailer which would have closed the discharge valve on the transport vessel.

A check valve designed to prevent liquid propane from escaping from the storage tank's inlet line also failed. This failure allowed approximately 30,000 gallons of liquid propane to escape from the propane storage facility.

After an investigation by the United States Department of Transportation (D.O.T.) into the accident, it was determined that existing systems for shutting off product flow in case of a line failure do not always operate properly. On Aug. 15, 1997 the Research and Special Programs Administration (RSPA) of the U.S. Department of Transportation issued a final ruling under 49 C.F.R. §171.5 of the Hazardous Materials Regulations requiring all MC330/331 (a classification of the United States Department of Transportation) transport vessels to install a working device to detect a failure in the pressure line between the transport vessel and the receiving storage vessel and automatically shut off the flow of product from the transport tank without human interaction or assistance.

Existing manual safety shutdown valves are typically already in place on most of the MC330/MC331 tankers in operation. They primarily consist of manual valves with a self closing spring and a latch held in the open position by a pin connected to a cable. The cable is in turn connected to a spring chamber, which is held extended with air pressure. If a condition arises in which the flow of product must be stopped, the operator must activate one of the manual air valves located at opposite ends of the trailer which will vent the spring chamber which with the lack of air pressure will retract and pull on the cable. This withdraws the pin and closes the latch, which closes the fluid product shutoff valves connected to it. If a fire were to start the air lines, which would melt very quickly, venting the spring chamber, and closing the product valves as well, without human intervention.

Existing shutdown systems, as described above, do not meet the requirements required by the above D.O.T. mandate because they do not operate reliably under all pressure and temperature conditions or they require human intervention to activate the safety device. The existing automatic excess flow shutoff valve located at the outlet port or ports of the tanks on an MC330/MC331 Transport or Bobtail work well only in the unlikely event that the attached plumbing between the outlet of the excess flow valve and the product pump is sheared off in an accident. This shearing causes a high differential pressure across the excess flow that valve would that usually force the excess flow valve to close.

In contrast, during normal unloading of product the excess flow valve must be set for a higher flow rate than the product pump transfers product out of the transport vessel or the valve would close during normal pumping operations. Because a line break typically occurs in the flexible line located between the pump outlet and the receiving stationary vessel, the actual flow rate across the excess flow valve tends to remain about the same because of the presence of the product pump in the line which tends to act as a line restriction. This allows product to continue to escape even if the product pump has stopped turning because a higher than usual flow condition is not created which would force the excess flow valve to close.

The industry has known for decades that existing excess flow valves did not operate under all known temperature and operating conditions. Although accidents and injuries are not common, the potential for catastrophic property damage, injury, and death does exist if a propane or butane leak were to ignite, or Anhydrous Ammonia (Nh3) were to drift into a populated area. The existing manual shutdown systems currently installed on all MC330/MC331 transport vessels in addition to the excess flow valves, must be activated by the operator if a problem should arise.

The pressure required to transfer liquid propane, Anhydrous Ammonia (Nh3), and Butane vary depending on line size, product temperature, air temperature, and the pressure existing in the receiving tank system. The industry needs a device that will detect a break in the line between the transport vessel and the receiving vessel during unloading operations and automatically close all valves allowing product to escape from the transport vessel. In addition to this requirement the device must also automatically shutoff the flow of product from the vessel in case of a fire. A fusible link or device must cause the product valves to close when the temperature exceeds 250° Fahrenheit. Further, the device must be compatible with existing equipment already in the field and use as much of the existing equipment on each installation as possible to reduce installation expenses and operator inconvenience.

SUMMARY OF THE INVENTION

The present invention automatically detects and closes fluid product discharge lines located on the transport tanker using air pressure supplied by the truck's air compressor and related pressurized air supply system normally used to operate the truck's air brake system. The present invention monitors the fluid product line pressure of the discharge line downstream (on the outlet side of the pump when the pump is pumping) of the product pump by detecting the line pressure from a single point in the discharge line. The present invention works under all ambient temperature conditions typically encountered by MC330/331 transport vessels.

The present invention, which is called a Line Break Detector (LBD), is based on the fact that during normal product transfer the fluid product line pressure always rises during the operational transfer of fluid product from the transport vessel to the stationary vessel. If the pressure should fall below the predetermined point from the pressure that the fluid product line has achieved during the transfer of product, the invention will sense the fact that the pressure has dropped a predetermined differential pressure from a previously attained set point pressure and cause all valves allowing product to escape from the transport vessel to automatically close without human intervention or action. It is an important feature of this invention that the line break detection system is actually tested and functions during every delivery or off loading cycle that the transport vessel is used.

The sensing device must be capable of allowing some pressure fluctuation in the line to occur which could be present because of the trucks engine slowing down slightly because of the engagement of cooling fans or air compressors which routinely turn on and off during the delivery of product. When the engine slows down the product pump which is driven indirectly by the trucks engine also slows down allowing the line pressure to drop slightly. The device must be capable of determining the difference between minor line pressure fluctuations and an actual hose or line break.

In order for the product to be pumped from the truck, some means of opening the main shutoff valves located on the transport vessel to allow product to reach the trucks product pump must be provided so the unloading operation can begin. A means for accomplishing this step has been provided for.

A linear mechanical line break detector for use on a mobile transport, the mobile transport having a supplying vessel disposed thereon for transporting a fluid product includes a sensor/actuator having a linear mechanical shiftable component, the shiftable component being in fluid communication with a transfer line, the fluid product in the transfer line communicating a fluid pressure to exert a force on the shiftable component, said force acting to shift the shiftable component. A valve actuator is shiftable between a set disposition and a trip disposition, the trip disposition being a default disposition. The valve actuator is operably coupled to the sensor/actuator. A selected shifting of the sensor/actuator shiftable component acts to set the valve actuator, the valve actuator being operably coupled to a fluid product shut off valve. The valve actuator maintains the fluid product shut off valve in an open disposition when the valve actuator is in the set disposition and maintains the fluid product shut off valve in a closed disposition when the valve actuator is in the trip disposition.

The present invention is a linear mechanical line break detector for use on a mobile transport, the mobile transport having a supplying vessel disposed thereon for transporting a fluid product, the vessel having an outlet for transferring fluid product from the supplying vessel, the flow of fluid product from the outlet being controlled by a fluid product shut off valve, the outlet being coupled to a transfer line during transfer of fluid product under pressure from the supplying vessel to a receiving vessel, the transfer line being coupled to the receiving vessel for effecting transfer of the fluid product to the receiving vessel. The line break detector includes a sensor/actuator that is in fluid communication with the transfer line for sensing the pressure of the fluid product therein. A valve actuator has a set disposition related to a set disposition pressure and has a trip disposition related to a trip disposition pressure, a selectable pressure differential being defined between the set disposition pressure and the trip disposition pressure, the valve actuator being operably coupled to the sensor/actuator for actuation thereby to the set disposition.

DESCRIPTION OF THE DRAWINGS

FIG. 7a is a sectional view of the manifold assembly depicted in FIG. 7;

DETAILED DESCRIPTION OF THE DRAWINGS

The line break detector (LBD) of the present invention is shown generally at 100 in the figures. The LBD 100 is useful in detecting and controlling the effects of a break in a line that transfers a fluid product from a supplying vessel to a receiving vessel.

Figure 1:
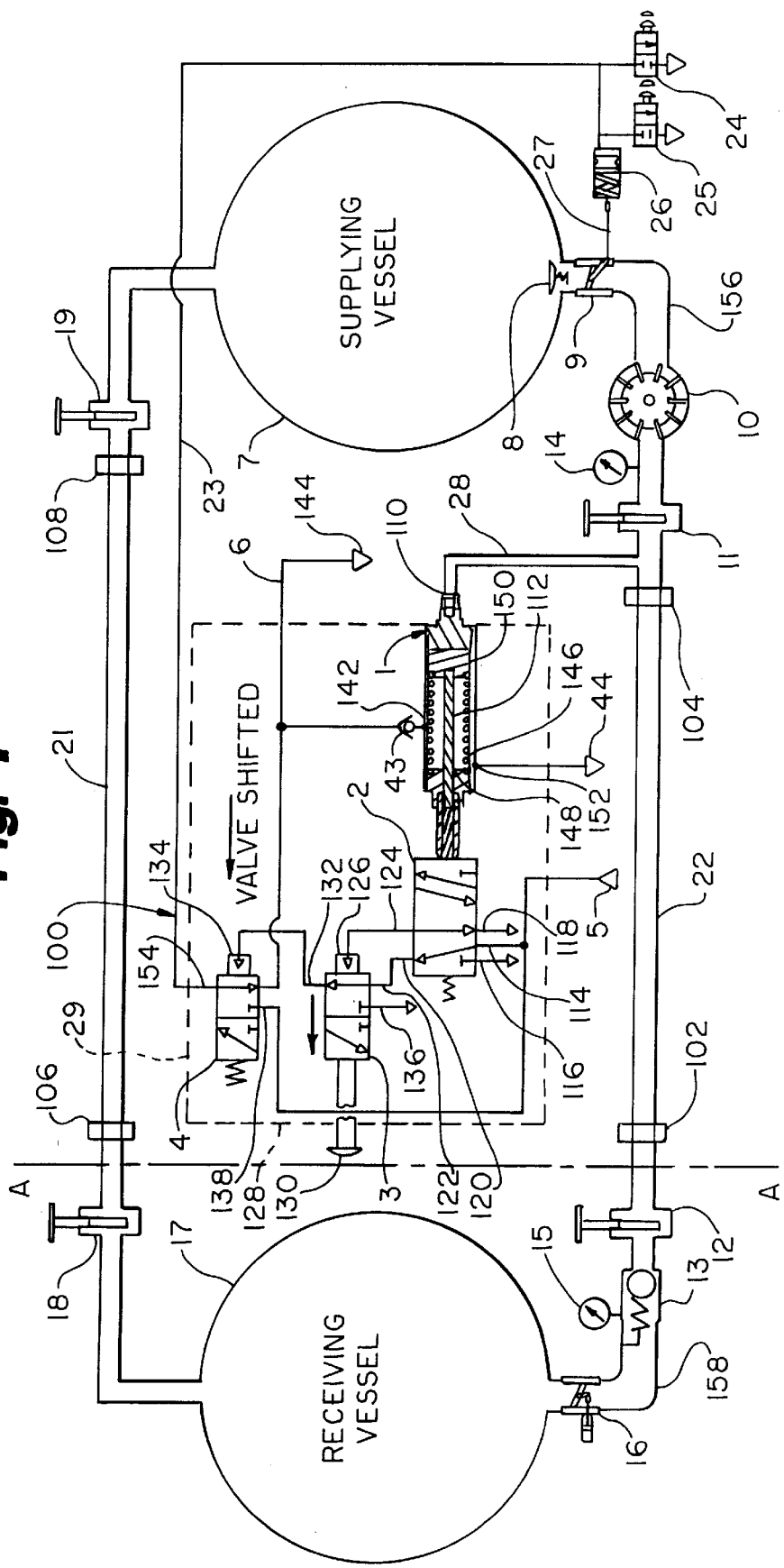
FIG. 1 is a schematic depiction of the line break detector of the present invention with all of the manual valves closed and the fluid product transfer line in a non pressurized state integrated into the transfer system between the transport (supply) vessel and the receiving vessel.

Referring to FIG. 1, the components that are left of the line A are typically associated with the receiving vessel 17. The components that are depicted to the right of the line A are associated with the supplying vessel 7. The supplying vessel 7 is typically mounted on a tractor trailer that is towed by a semi-type truck (tractor). The supplying vessel 7 is typically used to refill large storage tanks (receiving vessel 17) that contain fluid product, usually for subsequent distribution to residences and the like. The supplying vessel 7 may be mounted directly off the truck chassis (Bobtail), as is used typically for residential delivery of fluid product.

When the supplying vessel 7 is positioned proximate the receiving vessel 17, an operator pulls lines 21 and 22 from tubes on the trailer and connects the lines 21, 22 to the supplying vessel 7 at connectors 108 and 104 respectively and to the receiving vessel 17 at connectors 106 and 102 respectively. Line 22 is used to transfer fluid product from the supplying vessel 7 to the receiving vessel 17. Line 21 is used to maintain equal pressure in the supplying vessel 7 and the receiving vessel 17 during the transfer of fluid product.

FIG. 1 is an overall schematic depiction of the type of circuitry typically included in a line break detector 100 air logic system installed on a MC330/MC331 fluid product mobile transport type supplying vessel 7 connected to a stationary receiving vessel 17 commonly known as a bulk storage tank. The sensor/actuator of the line break detector 100 is depicted by numeral 1. Fluid product enters the fluid end of 1 via a small fluid product line 28 connected to the fluid product inlet port of sensor/actuator 1 at port 110. The piston and rod assembly 112 of sensor/actuator 1 actuate the 5-way, spring-offset, mechanically actuated, 2-position air valve 2.

Port 114 of valve 2 receives pneumatic air pressure from a pressurized air supply source 5. The pressurized air supply source 5 is typically the pressurized air generated by the tractor to operate the brakes on the tractor and the trailer. Ports 116 and 118 are vent lines which vent to atmosphere inside the enclosure 29. Port 120 of valve 2 is connected to port 122 of valve 3 and port 124 is connected to the air pilot port 126 of valve 3. Valve 3 is a detented, 2-position, air valve with a mechanical manual actuator either lever or push/pull knob, and an air piloted spool actuator on the opposite end of the valve actuating assembly.

When air pilot pressure is received at port 126 of valve 3, valve 3 shifts to the disposition depicted in FIG. 1. When pilot air pressure at port 126 acts on the right end of the spool (not shown) of the valve, the spool translates to the left. The manual actuator 128 is coupled to the second end of the spool at the opposite end of the spool will change positions and physically move the position of the knob 130 to the left as depicted, thereby allowing the operator to visually detect that the spool of the valve 3 has shifted. Port 132 of valve 3 is connected to air pilot port 134 of valve 4. Port 136 of valve 3 is a vent port to atmosphere.

Valve 4 is a 2-position, 3-way, spring offset valve with an air pilot actuator. Port 138 of valve 4 receives air pressure from air pressure source 5. Port 140 is directed to the vent line 6 in parallel to port 142 on valve actuator 1 and directed to atmosphere outside the mechanical LBD enclosure 29. Check valve 43 is in parallel to port 140 and vent line 6. Check valve 43 allows air pressure created between port 140 and outlet 144 of vent line 6 during the venting step to pass through check valve 43 and into the spring chamber 146 of LBD sensor 1. The check valve 43 is in place to prevent any fluid product that may bypass the fluid piston seal 150 on sensor 1 from traveling through the connected air lines and into any air valves 2, 3, and 4 and causing damage to the pneumatic components of the air valve 2, 3, and 4. When air pressure enters the LBD spring chamber 146, the air pressure is allowed to exit the chamber 146 at port 152 and exit the LBD enclosure 29 into the atmosphere at outlet 44.

Port 154 of valve 4 is connected to air line 23. Air line 23 supplies air pressure to the spring offset valve actuator 26. Valve actuator 26 must have air pressure applied to valve actuator 26 in order for fluid product shut off valve 9 to be manually or automatically opened. Existing manual air valves 24 and 25 are also connected with air line 23. Manual air valves 24 and 25 allow the operator to manually vent the air pressure in line 23 from two different points on the supplying vessel. Outlet 144 is an external vent line discharge point directing exhaust air collected from pneumatic air valve port 140 outside of the LBD enclosure 29. Existing excess flow valve 8 is commonly installed on these types of pressure vessels which could close if excess product flow were to exhaust from the pressure vessel. Fluid product pump 10 is used to transfer fluid product from the supplying vessel 7 to the receiving vessel 17. Pressure gauge 14 allows the operator to monitor the pressure downstream of pump 10. Pressure gauge 15 allows the operator to monitor the pressure in the fluid product line 158. Manually actuated shutoff valves 11, 12, 18, 19 (shown in a closed position) typically located proximate both ends of both the fluid product liquid line 22 and the vapor line 21 respectively. Check valve 13 is used to prevent fluid product from escaping from the receiving vessel 17 if valve 12 is opened or the line 22 is severed. Flow at the inlet port of the receiving vessel 17 is controlled by existing manual or automatic shut off valve 16. The spring applied actuator 26 is linked to the main shutoff valve 9 by the flexible link 27 located on the supplying vessel 7. Some shutoff valves are actuated directly with air pressure to open them and would not require an externally mounted actuator or linkage assembly.

Figure 5:
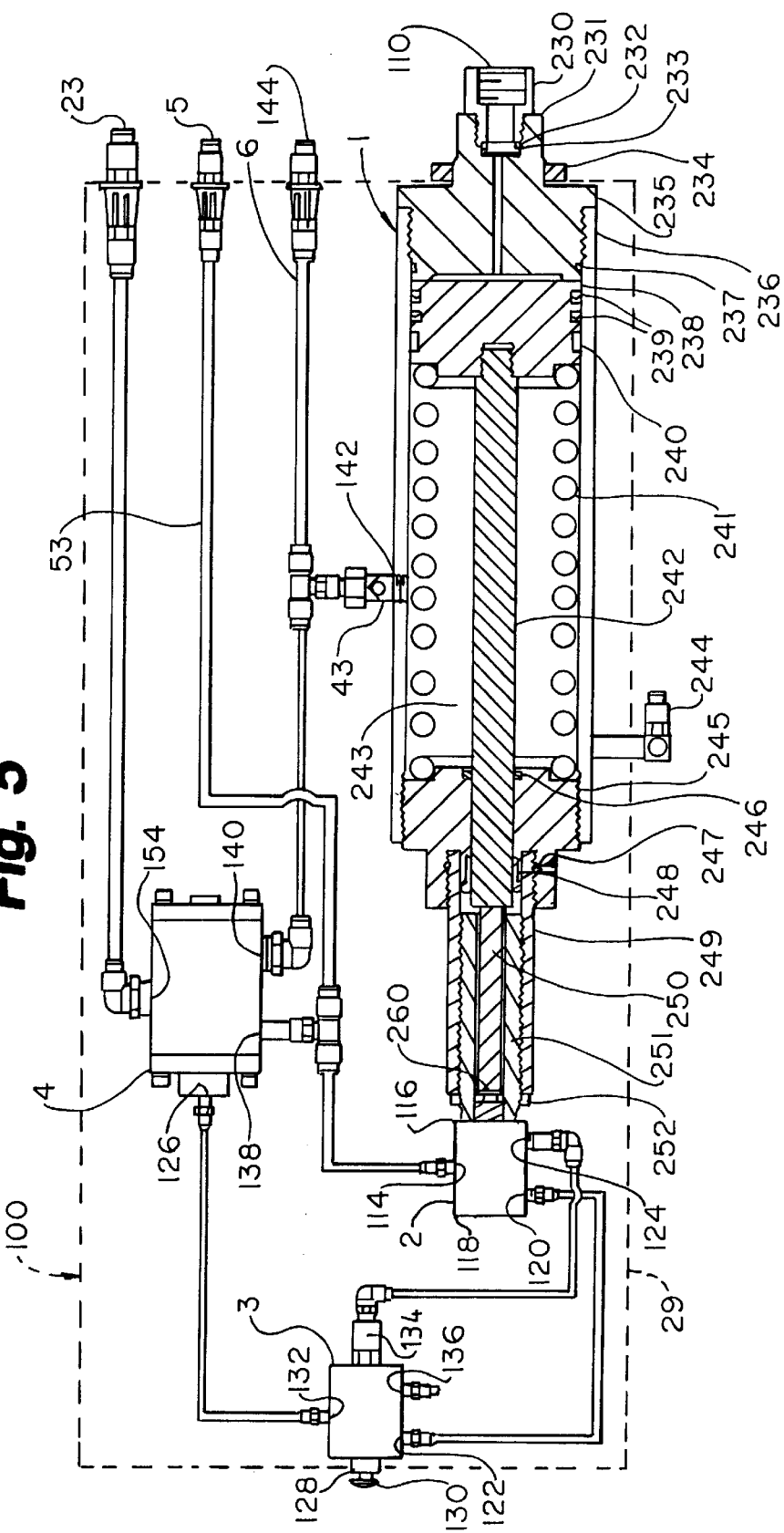
FIG. 5 is a sectional view of the line break detector pneumatic sensor/actuator.

FIG. 5 depicts the mechanical layout of a typical Line Break Detector (LBD) 100 sensor assembly including the various pneumatic air valves required and the plumbing relationship between the air valves with common pneumatic fittings and air line or tubing shown within the boundaries of a metal or plastic enclosure 29. The LBD 100 sensor assembly consists of a fluid product inlet fitting connection 110 using a common adapter fitting 230 converting ⅜" NPT female Pipe thread to a male O-ring sealed straight thread ⅞-14TPI with a common 910 size O-ring 231. Fitting 230 holds an O-ring 232 and stainless steel 10 micron filter assembly 233 in place inside the cavity machined into the "inlet head" 235. Inlet head 235, piston 238, rod cap 245 may be manufactured from a variety of materials including plastic, aluminum, steel, and stainless steel. The type of material used is determined by the type of fluid product to be sensed and the material used must be compatible with the fluid product that will come in contact with the parts. For instance, Anhydrous Ammonia Nh3 is not compatible with aluminum or bronze but is compatible with mild steel and stainless steel.

The cylinder tube/barrel 236 is typically made from steel tubing and the ID surface has chrome plating applied to prevent corrosion from the atmosphere and provide a hard smooth surface for the piston seals to travel on. Stainless steel cylinder tubing could also be used but is generally cost prohibitive unless required by the type of fluid product that will be present in the cylinder chamber.

The inlet head 235 is sealed to the cylinder barrel 236 with a common O-ring 237 to prevent fluid product from escaping into the atmosphere. A threaded nut 234 is used to attach the LBD 100 sensing body to the surface of the enclosure 29. Two common lip type seals 239 are attached to piston 238. One lip type seal 239 is the primary seal to contain the fluid product and the other lip type seal 239 is used as a backup to the first lip type seal 239 to prevent fluid product from bypassing into the spring chamber 243 and out into the atmosphere through vent port 244 if the first seal 239 should fail. An air cylinder nylon or Teflon bearing 240 is used to prevent contact between the piston 238 surface and the cylinder barrel 236 inside surface causing damage to the piston and barrel.

Spring 241 is piloted between the piston 238 and the rod cap 245. Spring 241 is matched to the forces generated by the area of the piston 238 and the fluid product pressure to be anticipated in the design. The spring rate of spring 241 is determined by determining the minimum force required to retract the cylinder rod 242 and piston 238 back to the position shown in FIG. 1. The maximum spring force required is determined by multiplying the maximum fluid product pressure anticipated times the piston area equals maximum spring force required, (Max Fluid Product Pressure)×(piston area in square inches)=maximum spring force required. The spring rate per inch is calculated by subtracting the minimum spring force required from the maximum spring force required, divided by the total travel in inches that the spring 241 will be allowed to travel. Note that the length of spring 241 is determined by a combination of factors including spring compression rate and the solid spring height needed to prevent spring failure.

The rest of the components in the LBD 100 air sensor/actuator are described as follows: Rod cap 245, rod seal 246, retaining ring or ball bearings 247, rod bearing or support bushing 248, adjustment barrel 249, drive pin 250, rod travel limiter and air valve bracket 251, and lock nut 252.

Sensor/actuator 1 acts to actuate the valve 2. Sensor/actuator 1 operates by receiving fluid product line pressure at port 110. The fluid product line pressure applies force to piston 238 and seal 239 which applies a force against spring 241. When the force applied by the fluid product pressure to the piston 238 overcomes the opposing bias exerted by the spring 241, the force compresses the spring 241, thereby allowing the piston 238 and rod 242 to shift to the left to a point of equilibrium between the bias exerted by the spring 241 and the force of the fluid pressure acting on the piston 238.

Air valve 2 is actuated by drive pin 250 acting on the spool head 260 of air valve 2. By adjusting the length that the rod 242 must travel to reach drive pin 250 in relationship to the desired travel of spring 241 and fluid product force bearing on the piston 238, the desired "set" pressure can be adjusted by manually turning the threaded adjustment barrel 249 and moving the rod travel limiter 251 to the desired disposition. Tightening the jam nut 252 locks the threaded adjustment barrel 249 in the desired position when adjustment is finished. After the drive pin 250 has activated the valve 2 by bearing on the spool head 260, the cylinder rod 242 is prevented from further travel by contacting rod travel limiter 251 which prevents the force exerted by the rod 242 from damaging internal components of the air valve 2 assembly.

Valve 4 is used in the circuit to vent all of the pneumatic line pressure holding the air/spring valve actuator 26 (FIG. 1) in the fluid product valve open position with the spring thereof being compressed by the pneumatic line pressure. Accordingly, valve 4 is typically larger than pneumatic pilot valves 2, 3, so that pneumatic air pressure will vent from line 23 as fast as possible when the LBD 100 pneumatic logic circuit trips.

Figure 2:
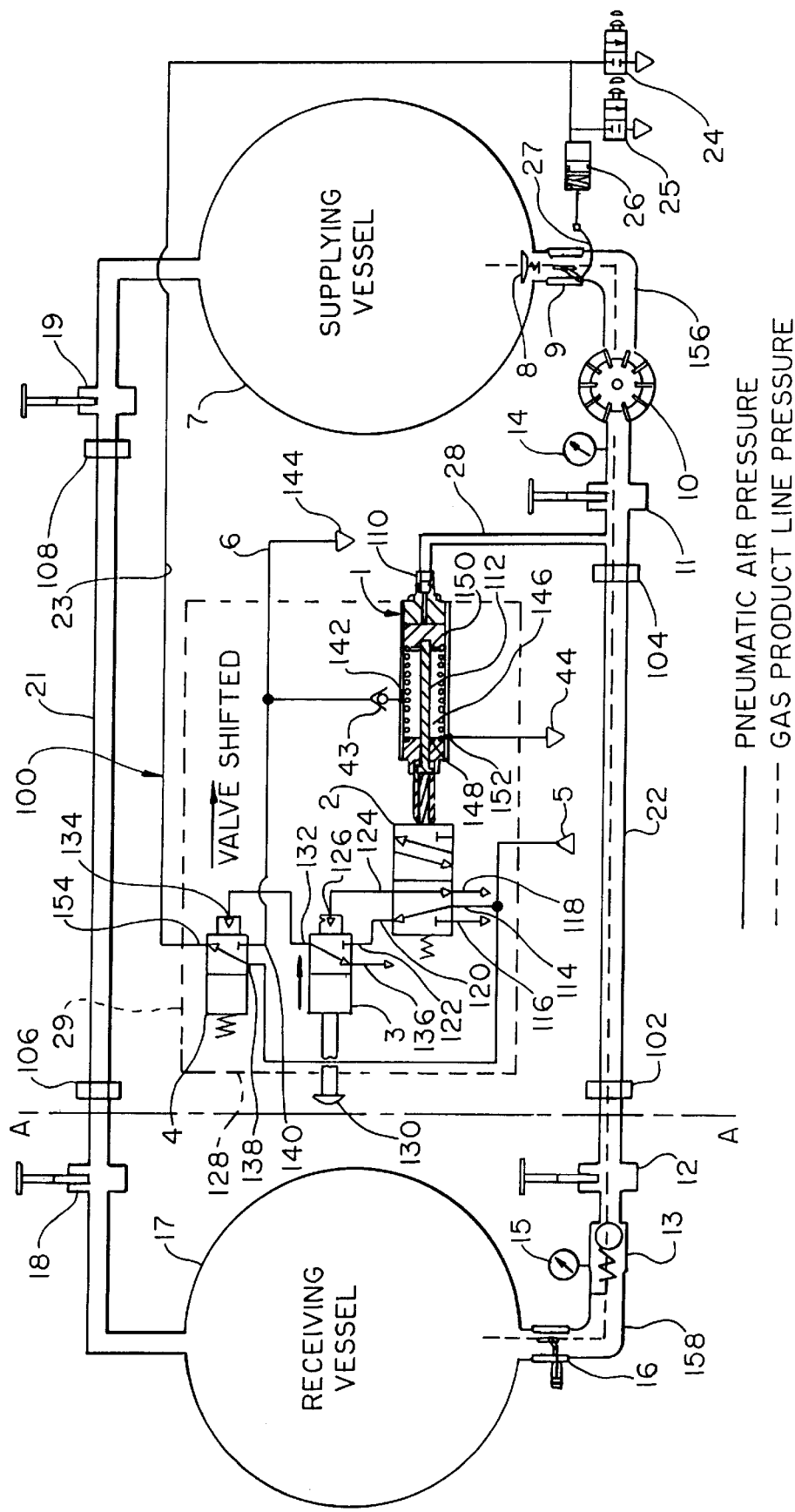
FIG. 2 is a schematic depiction of the line break detector of the line break detector system of FIG. 1 with the pneumatic flow paths and pneumatic valves shown in the positions required to initially open the fluid product main shut off valve(s).

Operation of the LBD 100 may be understood with reference to the sequence of events as depicted in FIGS. 1 through 4. FIG. 2 depicts the same pneumatic logic circuit described in FIG. 1, except that the LBD 100 is in the "Reset" configuration. In order for the fluid product to reach the product pump 10, the main fluid product shutoff valve 9 plumbed to the inlet port of the fluid product pump 10 must be opened. In order for this to happen, pneumatic air pressure must compress the spring to close valve actuator 26. This slackens the link 27, thereby allowing the fluid product shut off valve 9 to be opened manually or directly. In order for this step to take place the operator must manually move pneumatic valve 3 to the "Reset" position shown in the schematic diagram in FIG. 2 by pressing on knob 130 and shifting the spool to the right. FIG. 2 depicts the "reset" configuration of the LBD 100, in which the pneumatic logic circuit with the various components positioned to allow pneumatic air pressure to pressurize air/spring actuator 26, thereby allowing the main fluid product shut off valve 9 to be opened either manually or directly (if so designed by the manufacturer of the main fluid product shut off valve 9).

Pneumatic air pressure from pressurized air supply source 5 is plumbed to port 114 of valve 2 and passes out port 120 and is then plumbed to port 122 of valve 3. Port 122 is blocked in the "reset" position, as depicted in FIG. 2. Pneumatic air pressure is also plumbed to port 138 of valve 4. Port 138 directs the air pressure to port 154 and then through plumbing 23 to open spring actuator 26. Valves 24, 25 are typically plumbed into line 23 in parallel to allow the operator to manually vent air pressure in line 23 in case of an accident or failure of the primary line break detection circuit. Valves 24 and 25 are typically existing on current installations of MC330/MC331 fluid transport vehicles with spring-to-close pneumatic valve actuator 26 and need not be removed in order for the new Line Break Detector 100 pneumatic logic circuit to operate properly, provided that valves 24 and 25 are kept in their normally closed position as shown. Manual fluid product line shutoff valves 11, 12, 18, 19 are shown in their open condition.

Figure 3:
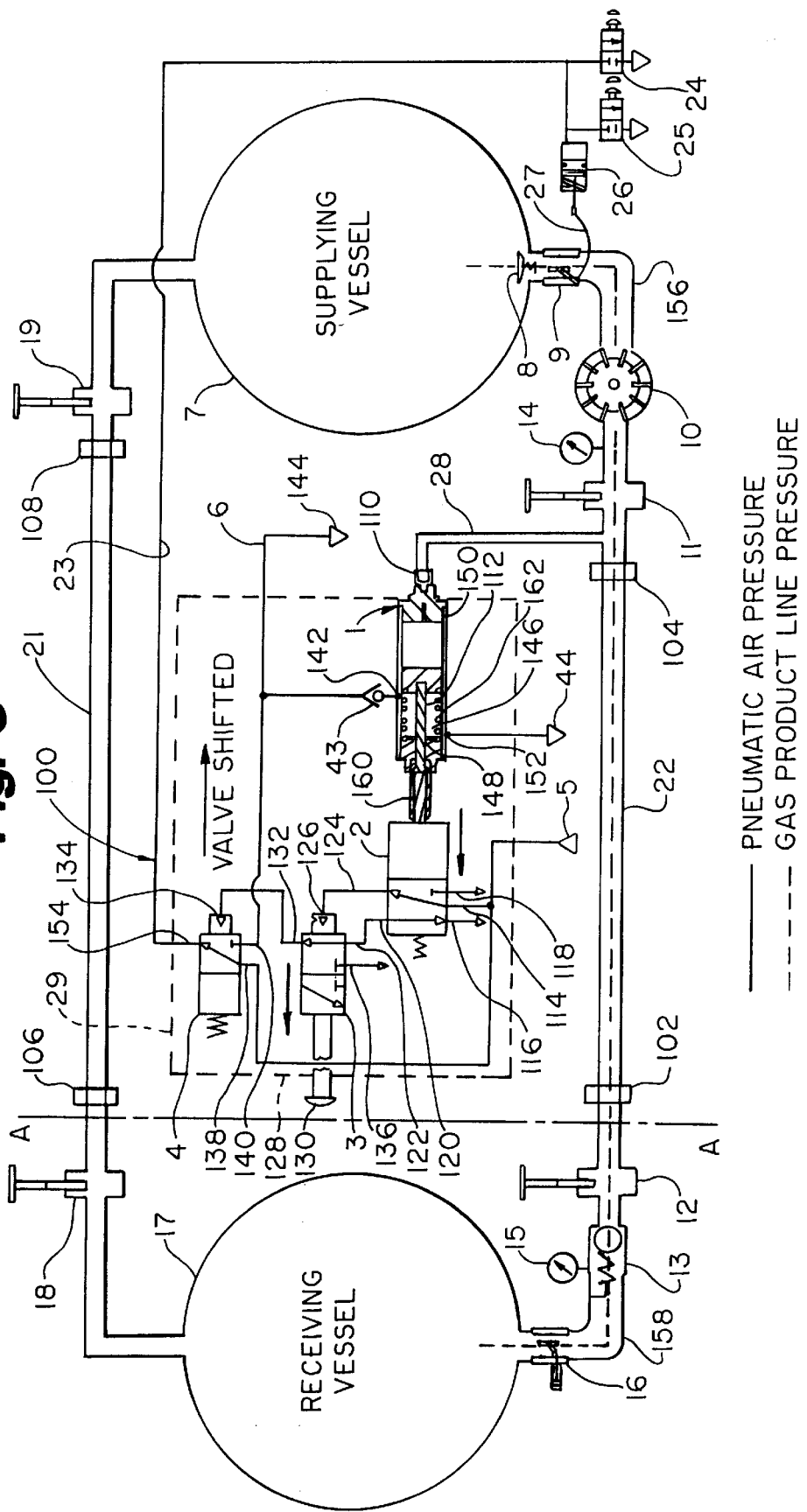
FIG. 3 is a schematic depiction of the line break detector of the line break detector system of FIG. 1 in its "set" mode.

FIG. 3 depicts the same pneumatic logic circuit described in FIG. 1, but with the LBD 100 in the "Supply" configuration in which fluid product is being pumped from the supplying vessel 7 to the receiving vessel 17. Once the fluid product product pump 10 has been started or if enough pressure from the supplying vessel 7 passes into line 22, the line pressure will rise enough to overcome the spring force of the spring 162 in the spring chamber 146 in sensor/actuator 1. When the line pressure has risen above the point required to actuate sensor/actuator 1, actuator 160 shifts to the left, as depicted, against the spring bias and shifts the 5-way air valve 2 and move the spool pattern to the "set" position.

The "set" position is the point at which if the fluid product line pressure were to fall below this point the Line Break Detector 100 air logic circuit would trip and vent pneumatic air pressure to outlet 144. This applies tension to link 27, thereby closing the main fluid product shutoff valve 9 and interrupting the flow of fluid product from the supplying vessel 7. This set pressure is determined by the needs of the operator based on expected temperature and line pressure conditions. This spring setting may be set to react to any fluid product line pressure, but for most MC330/MC3301 tanker transport applications this line pressure would range from 10 to 375 PSIG. Referring to FIG. 5, the pneumatic valve 2 engagement is changed by adjusting the position that the actuator 250 engages mechanical actuator 260 of valve 2. This is done by adjusting the stroke that the actuator 250 has to travel to reach valve 2 in relation to the fluid product pressure force compressing the spring 241 inside the LBD spring chamber 243, as described above.

Once valve 2 has shifted to the "set" position as depicted in FIG. 3, pneumatic air pilot pressure is directed from port 114 to port 124 of valve 2 and directed via plumbing to port 126 of valve 3. When port 126 of valve 3 is pressurized with pneumatic air pressure it will also shift to its "set" position and physically move the valve spool to its "set" or leftmost position. The shift of the spool moves the manual knob 130 to the "set" position so that the operator can detect by vision that the valve 2 has shifted and the pneumatic logic circuit has "set". Note that once "set", if the fluid product line pressure should drop below this set pressure, the pneumatic logic circuit would "trip" and vent the air spring chamber 243 (FIG. 5) of the sensor/actuator 1 through port 110. Once the fluid pressure is relieved and drops, the bias of the spring 241, acting on the opposite side of the piston 238 as the fluid pressure, causes the piston to translate to the right to the disposition depicted in FIGS. 1 and 2. Responsive thereto, valve 4 also shifts to the disposition depicted in FIG. 1. Air pressure acting on spring offset valve actuator 26 is lost. The spring of the spring offset valve actuator 26 translates to the right applying tension to link 27 to close the fluid product main shut off valve 9.

When the pneumatic logic circuit shown in FIG. 3 is in the "set" position, pneumatic air pressure continues to be directed from compressed air supply 5 to port 138 of valve 4 and directed to port 154 of valve 4. From port 154 of valve 4 air pressure is directed through line 23 to maintain pneumatic air pressure at air spring chamber 26. The fluid pressure overcomes the bias of the spring to slacken the link 27, thereby allowing the opening of the fluid product main shut off valve 9. Also shown in FIG. 3 existing excess flow valve 8, fluid product pump 10, gauge 14, 15, manual line shut off valves 11, 12, 18, 19, in their open position, fluid product liquid line 22, receiving vessel check valve 13, receiving vessel manual or automatic main shut off valve 16, receiving vessel 17, vapor line 21, supplying transport pressure vessel 7, linkage 27 from air/spring actuator 26 to main fluid product shutoff valve 9, line break detector enclosure 29, and check valve 43.

Figure 4:
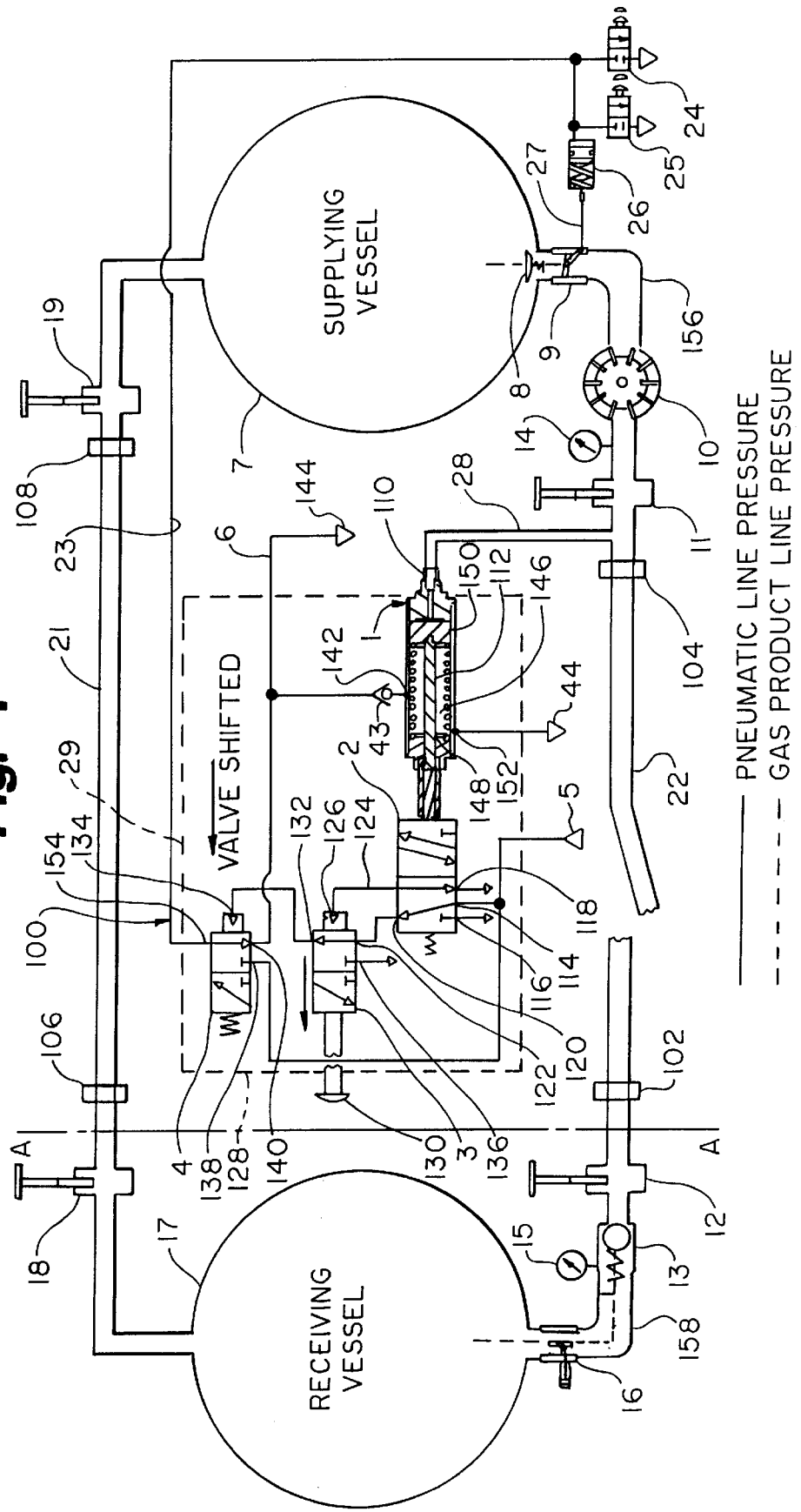
FIG. 4 is a schematic depiction of the line break detector of the line break detector system of FIG. 1 in its "trip" mode where as the fluid product line pressure has fallen below the trip pressure.

FIG. 4 depicts the same pneumatic logic circuit described in FIG. 1 with the LBD 100 responding to a break in the line 22 while fluid product is being transferred from the supplying vessel 7 to the receiving vessel 17. When the fluid product line 22 that is being sensed breaks or ruptures, the pressure in the line 22 drops below the "set" point described in relation to FIG. 3. The pneumatic air logic circuit of the LBD 100 then vents the air pressure that is required to hold the air/spring actuator 26 in the open position. As indicated above, this causes the spring to actuate to the right, tensioning link 27 and closing the main fluid product shut off valve 9. This action stops the transfer of fluid product from the supplying vessel 7, thereby preventing a hazardous spill of fluid product.

Responsive to the line break, the fluid product line pressure at port 110 of valve actuator 1 drops below the set point described with respect to FIG. 3. The spring force exerted by spring 241 reacts on the piston 238 and shifts the piston 238 to the right, thereby causing the 5-way air valve 2 to shift back to its default spool pattern shown in FIG. 4. Pneumatic air pressure from compressed air source 5 is then redirected from port 114 to port 120 of valve 2, which is directed by plumbing to port 122 of valve 3. Valve 3 has maintained its "set" position to this point. In the "set" configuration, valve 3 which directs pneumatic air pilot pressure to port 132. Port 132 is plumbed directly to air pilot port 134 of valve 4. When valve 4 receives air pilot pressure at pilot port 134, the 2-position spring offset 3-way valve (or a 5-way valve would also work) shifts to its "vent" position.

In the "vent" configuration, valve 4 blocks pneumatic air pressure from compressed air 5 at port 128 and vents all air pressure from line 23. Such venting causes the spring-to-retract air/spring actuator 26 to shift position. Absent the air pressure, the spring retracts, thereby closing, either directly or indirectly via a mechanical link, the main fluid product shut off valve 9 connected to the air/spring actuator 26. Closing the main fluid product shut off valve 9 immediately stops the flow of fluid product from the supplying pressure vessel 7.

Figure 6:
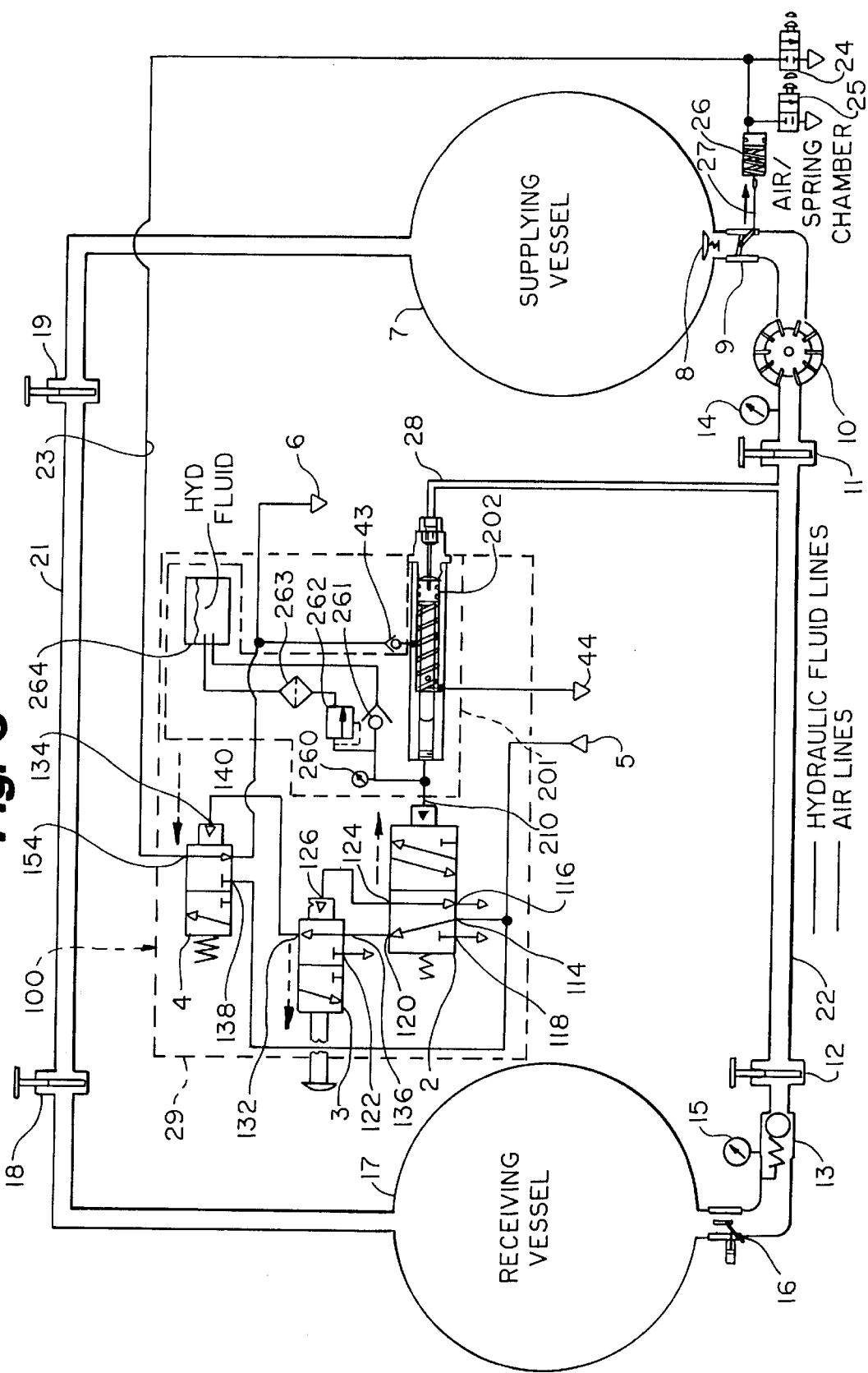
FIG. 6 depicts a second preferred embodiment of the design of the line break detector of the present invention.

Turning now to FIG. 6, like numbered components denote like components depicted in FIGS. 1–5. FIG. 6 depicts a second preferred embodiment of the design of the line break detector sensor/actuator of the LBD 100 at 201. This embodiment of LBD 100 converts the line pressure of the fluid product into a linear hydraulic pump which actuates the same 5-way 2-position air valve 2 and related pneumatic circuitry as in FIG. 1. The linear hydraulic pump 202 pumps more fluid as the fluid product line pressure increases. Excess fluid, beyond that required to set the hydraulically piloted air valve 2 at port 110, passes over a common relief valve 262 maintaining enough hydraulic pressure to keep the air valve 2 shifted in its "set" position, as previously described. This design allows the line break detector 100 to monitor the line pressure throughout the entire designed pressure range. If the fluid product line pressure being monitored should drop from any given point, the linear displacement pump 202 will retract and negatively displace hydraulic fluid causing the hydraulic pressure to drop. This causes the hydraulically piloted air valve 2 to shift back to its "trip" position after a known differential pressure drop in the fluid product line pressure from the highest pressure detected and the point at which the pneumatic valve trips. The trip causes the pneumatic logic circuit of the LBD 100 described previously, to vent pneumatic air pressure and close the attached fluid product shut off valve 9, preventing fluid product from escaping from the supplying vessel 7.

The linear hydraulic pump sensor/actuator 201 will be described in detail in conjunction with FIG. 7. A pressure gauge 260 allows the operator to monitor the hydraulic pressure developed by the sensor/actuator 201. A check valve 261 allows hydraulic fluid to pass from the reservoir (sump) 264 when the linear pump retracts (shifts to the right) and creates a vacuum pulling oil from the reservoir 264. A low pressure (0–100 PSI) common direct acting pressure relief valve 262 limits the plunger pump hydraulic pressure. Excess oil, displaced by the plunger pump 202 when the pressure in the fluid product line 22 is rising, passes over the relief valve 262. This acts to maintain valve 2 in the shifted "set" disposition. A hydraulic fluid filter 263 traps particles in the hydraulic fluid to maintain the cleanliness of the hydraulic fluid.

Figure 7:
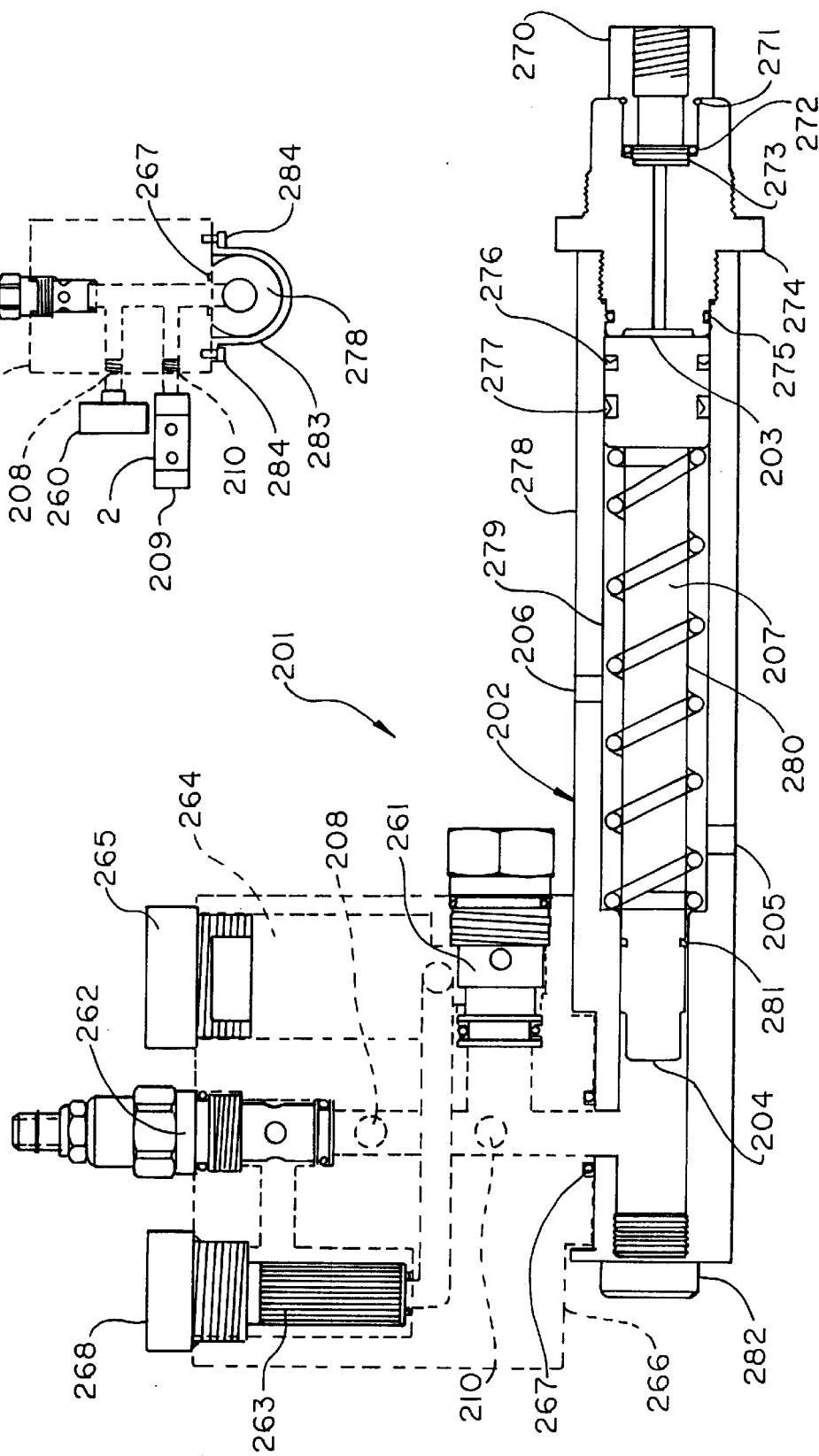
FIG. 7 is a sectional view of a complete air valve actuator of the line break detector of FIG. 6.

FIG. 7 depicts the second preferred embodiment components that make up a complete air valve 2 actuator assembly, sensor/actuator 201, as described in FIG. 6 which converts fluid product line pressure into a linear hydraulic pump and uses hydraulic pressure to shift pneumatic air valve 2. Since the intention of the invention is to monitor the fluid product line pressure as it is rising and maintain the valve 2 "set" position whenever the fluid pressure is steady or rising and also "trip" or allow valve 2 to shift back to its spring offset or "trip" position whenever the fluid product line pressure drops a predetermined amount, this drop in pressure and action is known as the differential pressure band of the line break detector actuator 202.

To determine the differential pressure drop, the relationship between the following components must be known:

range from low to high that the fluid product line pressure will vary (1–550 PSI, but more typically 15–375 PSI);

the area of the fluid piston pressure face 203;

the surface friction between the piston seal 276, wear ring 277, and the ID surface of the cylinder tube 278;

the displacement of the plunger pump rod 204, in relation to the spring rate, in relation to the fluid product pressure, in relation to the displacement that the hydraulic actuator of valve 2 requires to shift valve 2 from its "trip" position to its "set" position; and the hydraulic pressure force applied to plunger pump piston 204, the forces being additive to the force that the fluid product pressure must overcome.

In an example: if the hydraulic pilot actuator on air valve 2 requires 0.5 cubic inches of fluid at 40 PSI to shift the air valve fully from the "trip" to the "set" position and the desired differential rate (drop in fluid product line pressure from its highest pressure point reached to the desired "trip" pressure) was 20 PSI of fluid product, the fluid piston 203 would have to move the plunger pump piston 204 enough to displace 0.5 cubic inches of fluid at piston 204 as the fluid product line pressure rises 20 PSI. The (area of the fluid piston 203)×(the fluid product line pressure)=(the area of the plunger pump piston 204)×(the hydraulic fluid pressure 40 PSI)+(the spring forces to be overcome to allow the plunger pump 204 to displace 0.5 cubic inches of fluid)+(any additional friction forces generated by the piston seals and plunger pump seals).

After the air valve 2 has been shifted fully to the "set" position by the hydraulic fluid displaced (this full shift would typically occur before the fluid product line pressure reached the minimum line pressure to be measured), additional displacement of hydraulic fluid caused by the fluid product line pressure increasing and compressing the spring 279 further would pass over a relief valve 262 set at 40 PSI to maintain the valve 2 "set" position.

Referring to FIG. 7a, bracket 283 is used to attach manifold 266 to plunger pump body 278 with bolts 284. Manifold 266 is sealed to plunger pump body 278 with O-ring 267. Item 205 and 206 are vent ports to allow air to flush the spring cavity 207 of any gasses, pressure gauge 260 attaches to manifold port 208, and the air valve 2 hydraulic pilot actuator 209 attaches to manifold port 210.

Components located within the manifold assembly 266 include hydraulic relief valve 262, oil filter 263, oil reservoir 264, plug for reservoir opening 265, O-ring 267, cap for filter 268.

Components within the plunger pump assembly 202 of the sensor/actuator 201 include pipe adapter ⅜ NPTF to #10 ORB 270, O-ring #910 276, bearing 277, cylinder barrel 278, spring 279, piston and rod assembly 280, O-ring 281, plug fitting 282.

Figure 8:
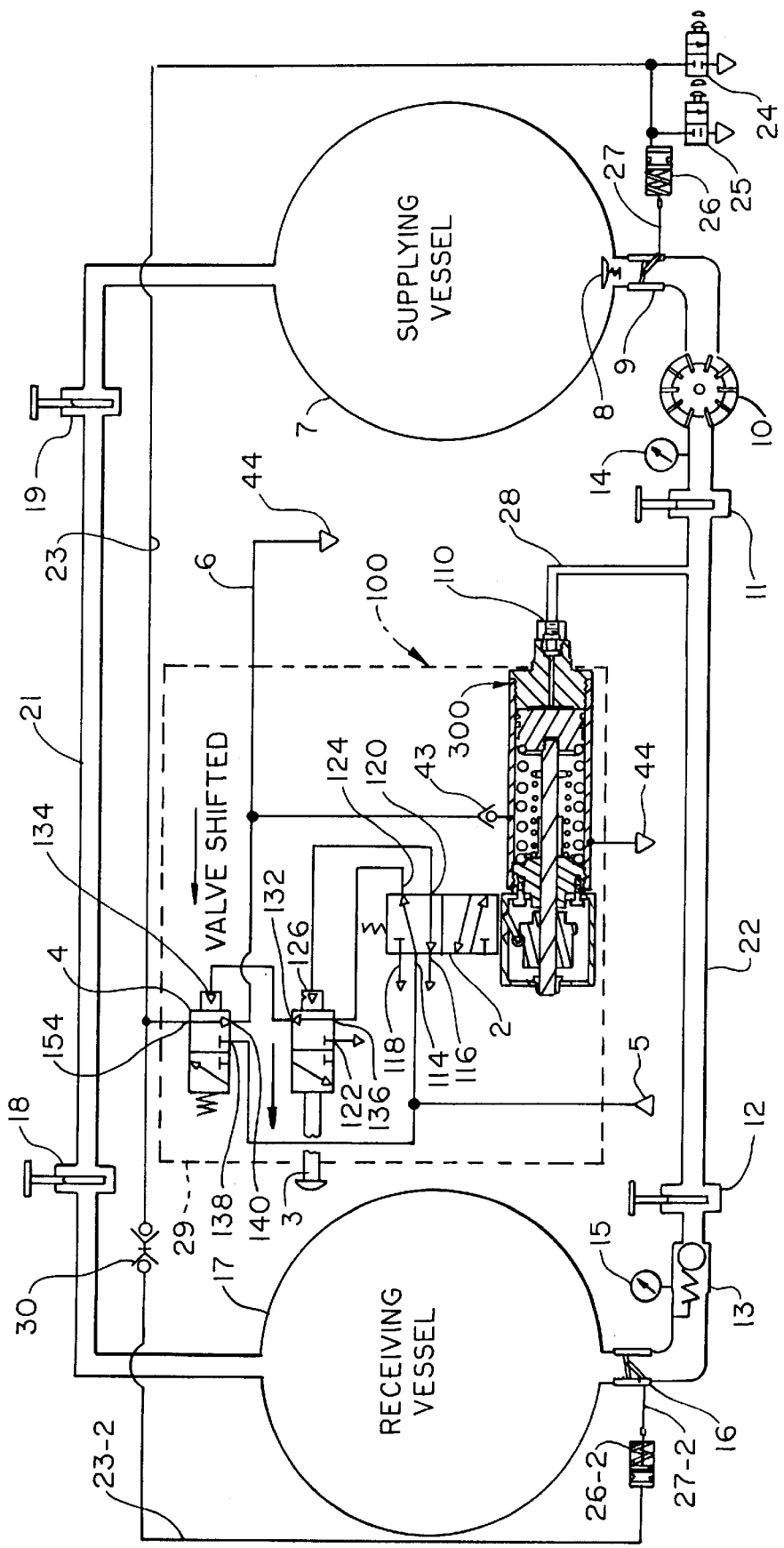
FIG. 8 is a schematic depiction of a third preferred embodiment of the line break detector of the present invention.

FIG. 8 depicts a third preferred embodiment of the design of the line break detector 100, with its components and circuitry shown. Like numbered components denote like components depicted in FIGS. 1–5. This embodiment converts the fluid product line pressure into a linear mechanical motion, the linear mechanical motion activating pneumatic air valve 2. The linear sensor/actuator is depicted at 300. In addition to the normal spring applied actuator 26 linked to the main shut off valve 9 on the supplying vessel 7, an additional spring applied actuator 26-2 is linked to the receiving vessel 17 main fluid shutoff valve 16. Spring applied actuator 26-2 is also connected to the LBD 100 pneumatic logic circuit by the use of a line coupler 30 that the operator manually connects whenever product is being transferred. This allows the line break detector 100 logic circuit to shut off the main fluid product shut off valves 26 and 26-2 on both vessels 7, 17 whenever the fluid product line pressure drops the predetermined pressure from its highest pressure point achieved. This then prevents fluid product from escaping from both vessels 7, 17 connected to the line break detector pneumatic circuit line 23 in case the connecting fluid product line 22 were to rupture.

The sensor/actuator 300 (described in detail with respect to FIG. 9) in the third preferred embodiment allows fluid product line pressure in line 28 to actuate a piston which advances (extends) a round shaft by compressing springs on the back side of the fluid product piston. As the round shaft advances (extends) friction material on the cam ID surface forces the cam to follow the advancing piston rod until the cam has actuated air valve 2 and moved the valves spool position from its "trip" to its "set" position. As the fluid product line pressure increases the cam stops advancing at a predetermined point and the round shaft continues to pass through the cam by overcoming the resistance between the friction material on the ID of the cam and the round shaft surface, this allows the rod to continue to extend and follow the pressure rise in the fluid product line pressure. If the fluid product line 22 should break the fluid product line pressure would fall allowing the piston in sensor/actuator 300 to retract and retract the round shafting which would also pull back the cam because of the friction material between the cam ID and the round shaft allowing pneumatic air valve 2 to shift back to its "trip" position and signal the LBD 100 pneumatic logic circuit to vent air pressure in line 23 and 23-2 forcing the spring offset valve actuator 26 and 26-2 to close main fluid product shut off valves 9 and 16.

As the fluid product line pressure continues to fall in line 22 and 28, the round shaft in sensor/actuator 300 will continue to retract by overcoming the resistance between the friction material on the cam and the round shaft OD surface. The spring(s) inside the sensor/actuator 300 spring chamber will force the piston to retract and follow the falling fluid product line pressure until the piston has bottomed out and the spring(s) have fully extended returning the piston to its start position.

The differential rate (the difference between the highest fluid product line pressure reached and the trip point when the fluid product line pressure falls) can be adjusted by changing the distance that the cam travels from its extended high pressure point and its retracted "trip" point in relation to the spring(s) compression rate per inch and the area of the fluid product piston.

Figure 9:
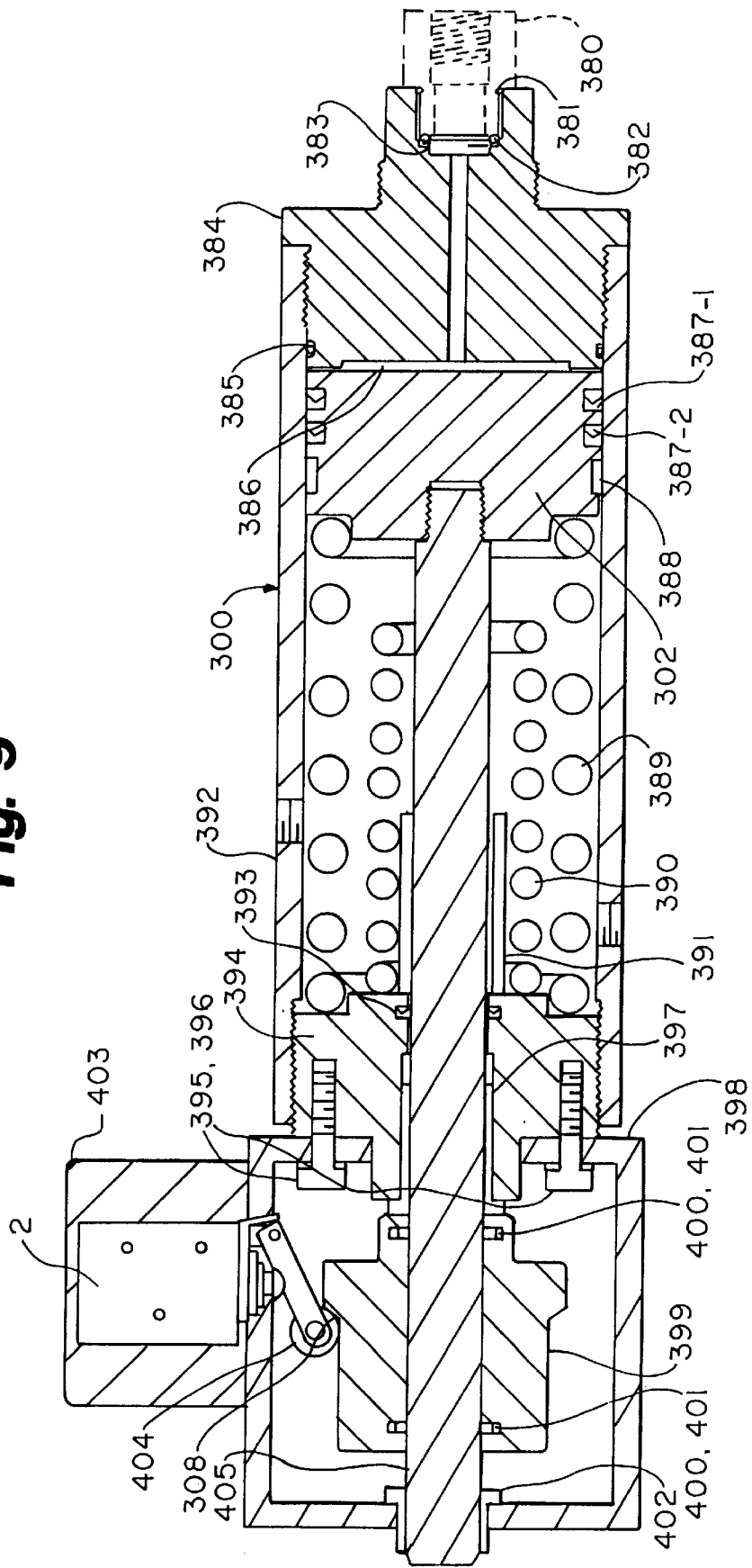
FIG. 9 is a sectional view of a complete air valve actuator of the line break detector of FIG. 8.

FIG. 9 depicts the third preferred embodiment components that make up a complete air valve 2 sensor/actuator 300, which converts fluid product line pressure into a linear mechanical force, the linear mechanical force actuating air valve 2 by advancing a cam. Since the intention of the invention is to monitor the fluid product line pressure as it is rising and maintain the valve 2 "set" position whenever the fluid pressure is steady or rising and also "trip" or allow valve 2 to shift back to its spring offset or "trip" position whenever the fluid product line pressure drops a predetermined amount, this drop in pressure and action is known as the differential pressure band of the line break detector actuator. To determine the differential pressure drop the relationship between the following components must be known:

range from low to high that the fluid product line pressure will vary (1–550 PSI, but, more typically, 15–375 PSI);

the area of the fluid piston pressure face 386;

the surface friction between the piston seals 387, wear ring 388, and the ID surface of the cylinder tube 392, and the force generated by the friction material between the cam 399 and round shaft 405 as round shaft 405 is extending; and the travel distance of the cam 399 in relation to the spring force rate/inch of travel.

Decreasing the travel of cam 399 (the space between cam 399 and bushing 402), shown in the cam 399 "trip" position, lowers the differential pressure rate. The differential pressure rate is the point between the highest fluid product pressure point reached and the point where pneumatic air valve 2 shifts back to its "trip" position, thereby allowing the LBD 100 pneumatic logic circuit to vent the spring applied valve actuator 26.

Further definition of the components in FIG. 9, fluid product pilot line 28 is attached to fitting 380. Fitting 380 is sealed to input head 384 with O-ring 381. Fluid product must pass through a stainless steel 10 micron filter 383. Filter 383 is sealed with O-ring 382. Input head 384 is threaded to cylinder tube 392 and sealed with O-ring 385. Fluid pilot pressure passes through input head 384 and applies pressure to the pressure face 386 of piston 302. Piston 302 has two seals 387-1 and 387-2. Seal 387-1 is the primary seal and seal 387-2 is the backup seal.

Cylinder bearing 388 prevents piston 302 from coming in contact with the inside of cylinder wall 392. Springs 389 and 390 are located between piston 302 and output head 394. Two springs are preferably used to allow a lower differential rate at lower fluid product line pressures and a higher differential rate when the fluid product line reaches a predetermined point (typically 50 PSI). Spring 389 is used to determine the low pressure differential rate between the start point and the point at which the piston contacts the inner spring 390, it also must have enough preload force to overcome the friction between the cam 399 and rod 405 to completely retract the piston 302 to its start position (shown in FIG. 9) when no fluid product line pressure is present at piston 302. The spring 389 preload is adjusted by turning in output head 394 until the correct spring preload is achieved. The correct spring 389 preload is checked by making sure the piston 302 is retracted and touching "in head" 385 with no pressure at port 380 and that the valve 2 is fully shifted before the fluid product pressure at 380 reaches 15 PSI or less than the desired minimum designed minimum set pressure. If spring 389 has too much preload, the point at which the cam 399 actuates air valve 2 to its "set" point will increase. When piston 302 comes in contact with the inner spring 390, both spring 389 and 390 work together and the effective differential rate is increased to match the sum of the combined spring force rate/inch. The effective force rate/inch of both springs 389, 390 may be the same. This doubles the differential pressure rate when the second spring 390 was engaged. The only limiting factor is the physical characteristics of the springs 389, 390 in relation to inside diameter and length of cylinder tube 392 and the outside diameter of the shaft 405. The combined spring forces of the springs 389, 390 must be capable of counteracting the force of the fluid product line pressure against the pressure face 386 of piston 302 throughout the intended usable fluid product sensing range of the actuator (typically 15–375 PSI).

A spacer 391 is used to prevent the spring 390 from coming in contact with the round shaft 405 and the inside surface of spring 389. Spacer 391 also acts as a stop tube to prevent piston 302 from causing springs 389 and 390 to go solid in the case of a fluid product over pressure condition beyond the normal design limits of the springs 389, 390. Shaft seal 393 is used to prevent any fluid product that has bypassed piston seals 386 and 387 from migrating out at the surface of the rod 405. Thread sealant is used to seal the thread gap between output head 394 and cylinder tube 392 to prevent fluid product from migrating through the thread gap.

The inside surface of cylinder tube 392 must be plated or coated to provide a corrosion resistant and smooth surface for the piston seals to seal against. Bolts 395 and washers 396 attach valve bracket 398 to output head 394. Bearings 397 and 402 are used to support the shaft 405 and keep it centered. The bearings 397, 402 must be capable of operating without lubrication and must have a low coefficient of friction. Adding lubrication to the bearings 397, 402 would allow some lubricant to migrate onto the round shaft 405 and decrease the coefficient of friction between the friction material 400 and the round shaft 405 surface, thereby potentially allowing the cam 308 to not have enough force to operate valve 2 lever actuator 404 and move the valve 2 spool position to its "set" position.

Friction material 400 is preferably glass filled teflon piston seal material with a square O-ring 401 between the OD of the teflon piston material 400 and the ID of the cam groove of cam 399 to act as a loading device for the teflon piston material 100. The cam groove 308 of cam 399 must be matched to the overall cross section of seal 400 and 401 to achieve a correct balance of seal preload to assure the correct friction rate between the teflon piston ring 400 and the round shaft 405 surface. The cam groove 308 in cam 399 must be sufficient to force the actuating lever 404 attached to air valve 2 to fully shift air valve 2 from its "trip" to its "set" position. Bracket 403 is used to fine tune the position of valve 2 during assembly. Slots in bracket 403 allow valve 2 to be positioned vertically and horizontally to the correct position during final assembly. The bracket 403 and valve 2 must be locked in place with suitable fasteners and an anaerobic sealant or with suitable fasteners and roll pins in order to prevent relative movement during operation.

All parts previously described that may come in contact with the fluid product to be sensed must be suitable for use with the fluid product. O-rings and soft seals must be molded from compatible material, metals that may come into contact with the fluid product must also be compatible.

Figure 10:
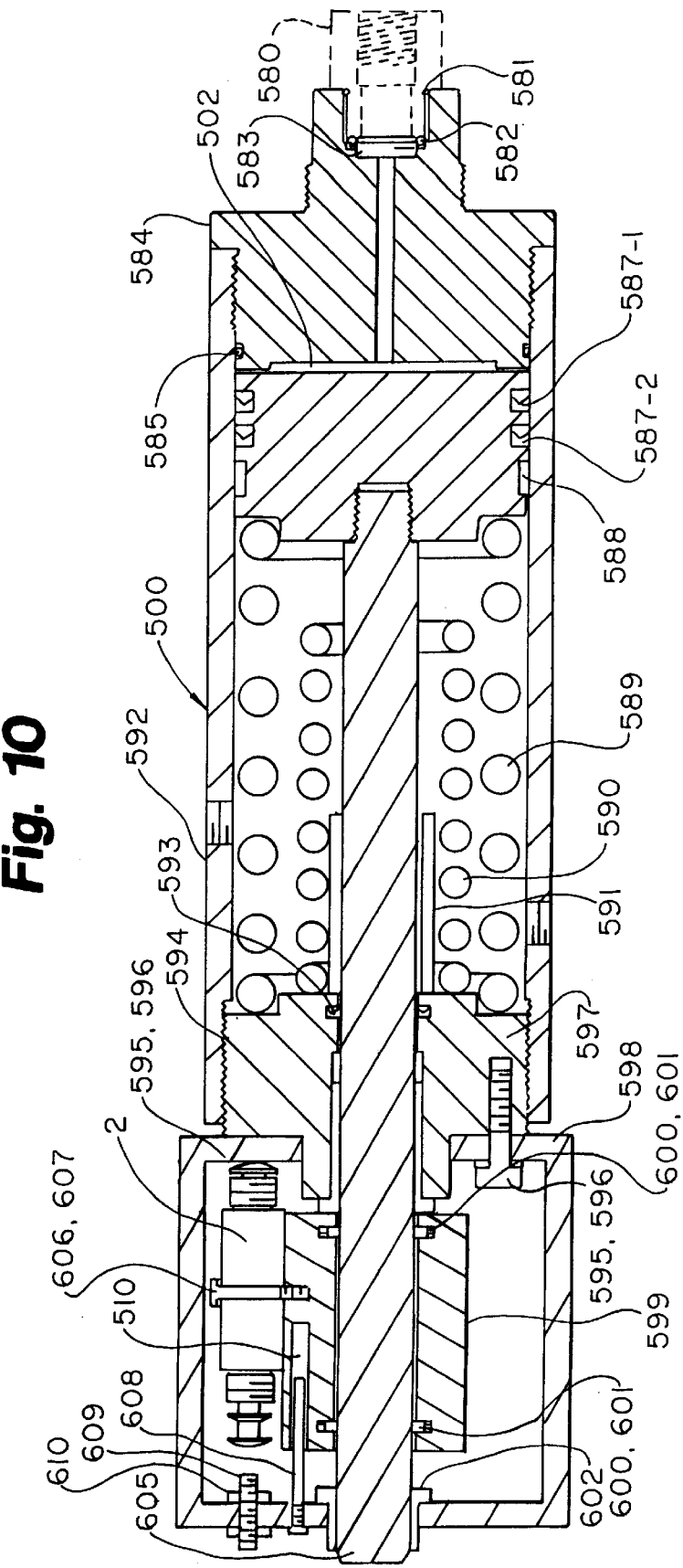
FIG. 10 is a sectional view of an alternative embodiment of the complete air valve actuator of the line break detector of FIG. 8.

FIG. 10 depicts a fourth preferred embodiment of the LBD 100 components that make up a complete air valve 2 actuator sensor/actuator 500 described in respect to FIG. 8. Sensor/actuator 500 converts fluid product line pressure into a linear mechanical force which actuates air valve 2 by advancing a cam. The 2-position air valve 2 is attached to the cam. To determine the differential pressure drop of the embodiment of FIG. 10, the relationship between the following components must be known:

range from low to high that the fluid product line pressure will vary (1–550 PSI, but, more typically, 15–375 PSI);

the area of the fluid piston item 586, the surface friction between the piston seals 587, wear ring 588, and the ID surface of the cylinder tube 592; and the force generated by the friction material between the cam 599 and round shaft 605 as rod 605 is extending and the travel distance of the cam 599 in relation to the spring force rate/inch of travel.

Decreasing the travel of cam 599 (the space between adjusting nut 609 and the manual actuator of valve 2), shown in its "trip" position in FIG. 10, lowers the differential pressure rate. The differential pressure rate is the point between the highest fluid product pressure point reached and the point where pneumatic air valve 2 shifts back to its "trip" position allowing the attached pneumatic logic circuit to vent the spring applied valve actuator.

In FIG. 10, fluid product pilot line 28 is attached to fitting 580. Fitting 580 is sealed to input head 584 with O-ring 581. Fluid product must pass through a stainless steel 10 micron filter 583. Filter 583 is sealed with O-ring 582. Input head 584 is threaded to cylinder tube 592 and sealed with O-ring 585. Fluid pilot pressure passes through input head 584 and applies pressure to the pressure face 502 of piston 586. Piston 586 has two seals 587-1 and 587-2. Seal 587-1 is the primary seal and seal 587-2 is the backup seal. Cylinder bearing 588 prevents piston 586 from coming in contact with the inside of cylinder wall 592. Springs 589 and 590 are located between piston 586 and output head 594.

A spacer 591 is used to prevent the spring 590 from coming in contact with the round shaft 605 and the inside surface of spring 589, and it also acts as a stop tube to prevent piston 586 from causing springs 589 and 590 to go solid in the case of a fluid product over pressure condition beyond the normal design limits of the springs. Shaft seal 593 is used to prevent any fluid product that has bypassed piston seals 586 and 587 from migrating out at the rod surface. Thread sealant is used to seal the thread gap between output head 594 and cylinder tube 592 from allowing fluid product to migrate through the thread gap.

The inside surface of cylinder tube 592 must be plated or coated to provide a corrosion resistant and smooth surface for the piston seals to seal against. Bolts 595 and washers 596 (two each per assembly only one each are shown) attach valve bracket 598 to output head 594. Bearing 597 and 602 are used to support the shaft 605 and keep it centered.

Friction material 600 is preferably glass filled teflon piston seal material with a square O-ring 601 between the OD of the teflon piston material 600 and the ID of actuator 599. Valve 2 is attached to actuator 599 with a bolt 606 and lock washer 607. Guide pin 608 screws into bracket 598 and slides into a bore 510 defined in actuator 599 keeping actuator 599 and valve 2 from turning. Adjustment bolt 609 and locknuts 610 are used to adjust the actuator 599 travel and thus adjust the differential pressure that valve 2 "trips" at from its "set" position.

Figure 11:
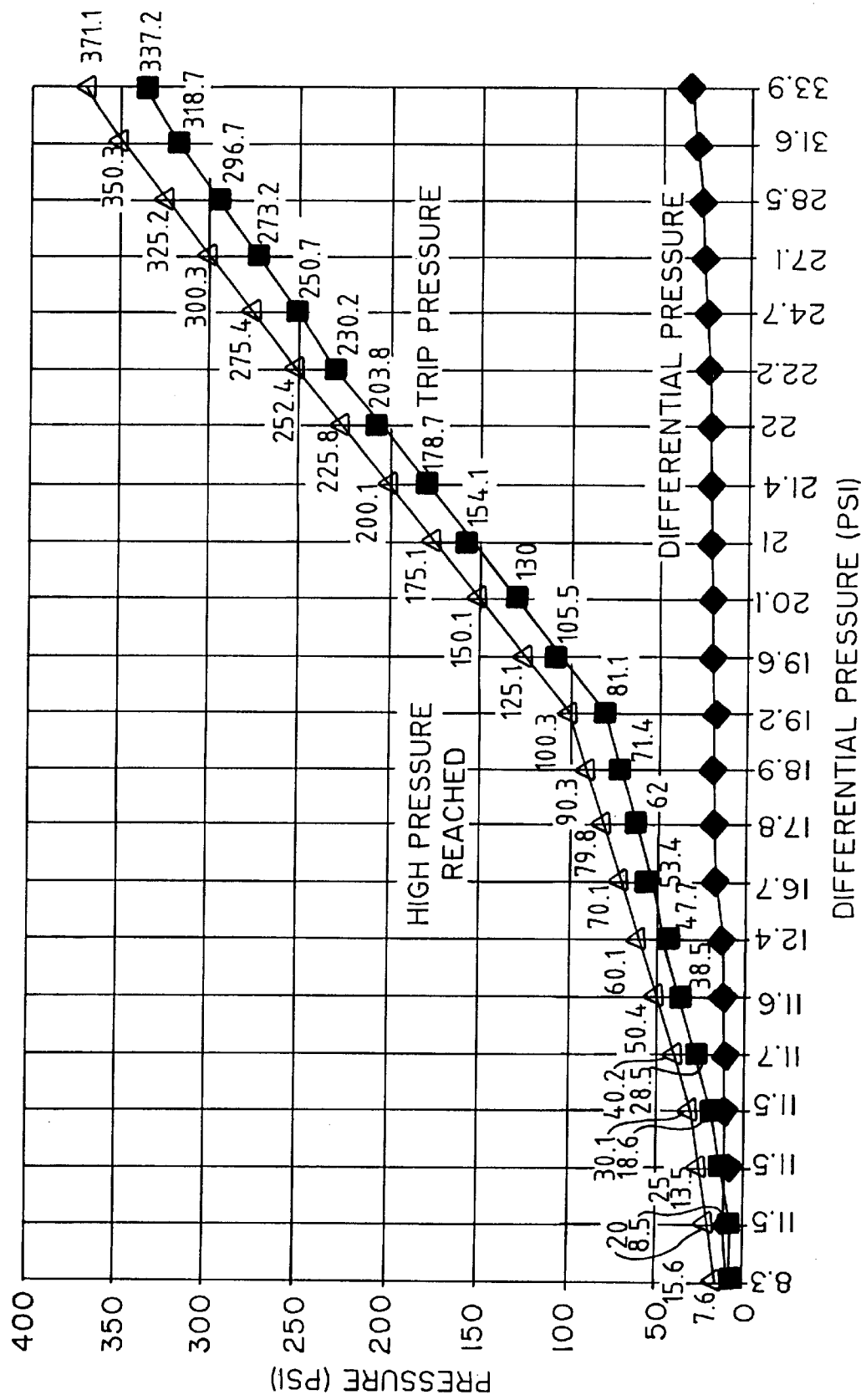
FIG. 11 depicts a graph showing differential pressure drops achieved in relation to pressure in the vessel using the design depicted in FIG. 9.

FIG. 11 depicts the average differential pressures achieved with the following component parameters using the embodiment of FIG. 9:

Piston 302: 3" nominal diameter

Spring 389: 275 pounds of force per inch of travel

Spring 390: 225 pounds of force per inch of travel

Friction force between cam 399 and shaft 405: 6 lbs

Cam 399 travel: 0.37 inches

Total piston 302 travel distance from 0 to 375 PSI: 5.8"

The line break detector 100 sensing device detects a drop in pressure from a given point that the fluid product line has achieved (the high pressure reached in FIG. 11) to a trip pressure that is less than the high pressure reached by an amount equal to a selected differential pressure during the transfer of fluid product from one fluid product storage vessel to another. It is important to note that the differential pressure never exceeds about 40 PSI over the full pressure range tested (about 15 to 375 PSI). The fluid product pressure in the transfer line 22 being sensed always rises as the transfer of fluid product proceeds and falls only if the fluid product transfer line 22 has ruptured or the fluid product being delivered has been depleted from the fluid product supplying vessel. The LBD 100 accurately and reliably senses when the fluid product transfer line 22 has been ruptured or severed or the product pump that is supplying fluid product to the fluid product delivery line has run out of product to pump, which also would cause the fluid product line pressure to drop. Only a differential pressure of less than about 40 PSI over the full pressure operating spectrum is needed to cause the LBD 100 to trip and cause the cessation of fluid product flow from the supplying vessel 7.

The graph of FIG. 11 depicts the results of 258,000 cycles of the LBD 100 in operation under a controlled, but varying environment and after successfully installing and operating two other LBD 100 devices on actual transports and bobtails for a period of three months. With the results of the extensive testing, it is possible to make the following statements relating the LBD 100 to existing devices:

(a) The LBD 100 works under a principle of sensing product pressure from a single source. Existing products operate under the principle of sensing differential pressures between two points.

(b) The LBD 100 has been proven to work automatically, without human intervention, between an ambient temperature range of −20° F. to 120° F. Existing products have been proven not to function at temperatures below 30° F. automatically.

(c) The LBD 100 has been proven to operate automatically, without human intervention, at varying transport product pressures. Existing products have been proven not to function at different product pressures automatically.

(d) The LBD 100 has been proven to operate automatically, without human intervention, at varying receiving vessel product pressures. Existing products have been proven not to function at different product pressures automatically.

(e) The LBD 100 has the capability of sensing a partial line break. This is not required by the DOT Ruling. Existing products cannot sense a partial line break.

(f) The LBD 100 has the option of interfacing with other shutdown components on the transport vehicles, such as clutches, brakes and engine. Existing products cannot interface with these same devices.

(g) The LBD 100 also works under the principle of sensing a set drop in product pressure to activate it. Existing products work under the principle of product drawing a vacuum which in turn activates it.

(h) The LBD 100 will work with any amount of product discharge piping downstream of the product pump. Existing products will not work if piping and product pumps are located downstream. These components cause added restriction in the line, which renders the existing products inoperable.

(i) The LBD 100 will work with receiving vessels to close their internal valves in the event of a line break. Existing products cannot do this.

The line break sensing device requires only one fluid product pilot line to be connected between the line break detector and the line that the line break detector is sensing pressure from. No fluid product is vented or wasted by the line break detector during normal operations. Because only one fluid product pilot line is required it makes it easier and faster to install or replace the invention in the field.

The invention described allows the operator to open the fluid product shutoff valves at the beginning of the unloading cycle by allowing air pressure to be directed to a spring-to-close pneumatic fluid product valve actuator so that fluid product can flow from the supplying vessel to the supplying vessels product pump. As soon as enough fluid product pressure has developed in the fluid product line and reaches a predetermined point the invention automatically sets a pneumatic logic circuit which from that pressure point in the fluid product line the pneumatic air logic circuit will vent the pneumatic fluid product spring-to-close valve actuator when the fluid product line pressure drops below a predetermined point. When the pneumatic air logic circuit trips it will vent air pressure from the spring-to-close pneumatic fluid product valve actuator causing the main fluid product shutoff valves to close immediately.

The invention automatically tests itself every time that a fluid product load is delivered to another vessel assuring the operator that the line break detector will work in the event that the fluid product delivery line should rupture or break during a delivery of fluid product.

The pneumatic circuit of the LBD 100 is designed to allow the operator to pressurize or open the fluid product spring-to-close actuator 26 and open the main fluid product shut off valve 9 and start the product pump 10, after which the pneumatic logic circuit of the LBD 100 will automatically "set" when the "set" pressure is reached. This is one unique feature because it allows the operator to detect that the minimum fluid product line pressure has been reached and the line break detector logic circuit has been "set" because the manual 3-way air valve 3 knob 130 will physically move and change positions that the operator can see. Because the 3-way manual air valve 3 will maintain its set position when the fluid product line pressure drops and the 5-way air valve 2 attached to the line break detector valve actuator 1 moves enough to allow the 5-way spring offset air valve 2 to move back to its default position, air pilot pressure will then be directed to the spring offset (air piloted 2-position) 3-way air valve pilot cap. This air pressure shifts the spring offset (air piloted 2-position) 3-way air valve against the spring offset default position, thereby changing the spool pattern and venting air pressure from the fluid product spring-to-close actuator. This results in closing the main fluid product shut off valve 9 and preventing the flow of product from the supplying vessel 7. Additionally, this results in blocking the flow of air pressure (typically supplied from the transport trailers air brake supply system) thereby preventing loss of air pressure from the truck's air brake system and maintaining the truck's air brake system ability to brake the truck.

When the spring-to-close actuator air pressure is vented, that same lack of air pressure could be used to shutdown the fluid product product pump preventing damage to the pump caused by running without product available. This is implemented by using an air piloted hydraulic valve (not shown) to operate a hydraulic motor that operates the product pump, or venting air pressure to an air piloted to the "on" position PTO (power-take-off) or clutch or pump drivetrain located off of the trucks transmission, which is also used to drive the fluid product product pumps in many applications.

An important feature of the design is that exhausting air from the spring to close actuator circuit is directed through the fluid product actuated air valve actuator 1 spring chamber 146. This will have the effect of purging any residual propane, anhydrous, or other fluids used from the spring cavity 146 in the actuator 1. This will help prevent potential corrosion problems in the actuator from anhydrous ammonia or other chemical reactions.

The present invention may be embodied in other specific forms without departing from the spirit of the essential attributes thereof; therefore, the illustrated embodiment should be considered in all respects as illustrative and not restrictive, reference being made to the appended claims rather than to the foregoing description to indicate the scope of the invention.

What is claimed:

1. A line break detector for detecting a break in a transfer line transporting a fluid product from a supplying vessel to a receiving vessel, the supplying vessel having an outlet for transferring fluid product from the supplying vessel, the flow of fluid product from the outlet being controlled by a fluid product shut off valve, the outlet being in fluid communication with the transfer line during transfer of fluid product from the supplying vessel to the receiving vessel, the transfer line being coupled to the receiving vessel for effecting transfer of the fluid product to the receiving vessel, the line break detector comprising a sensor/activator, the sensor/activator comprising at least one movable element operably couplable with the transfer line, the sensor/activator being constructed to sense a current pressure of the fluid product, to continually track a highest sensed pressure of the fluid product, and to define a trip pressure, the sensor/activator causing the trip pressure to increase when the highest sensed pressure increases, the sensor/activator being operably couplable to the fluid product shut off valve and being constructed to activate the fluid product shut off valve when the current sensed pressure drops below the trip pressure.

2. The line break detector of claim 1, wherein the difference between the highest sensed pressure and the trip pressure defines a differential pressure, the sensor/activator being constructed such that the differential pressure remains substantially constant as the highest sensed pressure and the trip pressure increase.

3. The line break detector of claim 2, wherein the sensor/activator comprises an adjustment device for allowing a user to set the differential pressure.

4. The line break detector of claim 3, wherein the adjustment device comprises an adjustment bolt.

5. The line break detector of claim 1, wherein the trip pressure defined by the sensor/activator remains substantially constant if the current sensed pressure drops below the highest sensed pressure.

6. The line break detector of claim 1, wherein the at least one moveable element comprises a piston operably couplable with the transfer line, the piston involving linearly as the current sensed pressure increases.

7. The line break detector of claim 1, wherein the at least one moveable element comprises a rod, operably couplable with the transfer line, and a cam supported by the rod, the line break detector further comprising a claim follower operably engaged with the cam.

8. The line break detector of claim 1, further comprising a valve assembly operably couplable between the fluid product shut off valve and the sensor/activator, the cam follower being constructed to activate the valve assembly and shut off valve at the trip pressure in response to movement of the rod.

9. The line break detector of claim 7, wherein the rod extends through an aperture in the cam and is slidably disposed therein.

10. The line break detector of claim 9, further comprising a friction material disposed in the aperture of the cam, the rod sliding through the cam by overcoming the resistance between the rod and the friction material.

11. The line break detector of claim 10, wherein the rod slides through the cam in a first direction as current sensed pressure increases, to track the highest sensed pressure.

12. The line break detector of claim 11, wherein the rod and cam move together in a second direction opposite to the first direction as current sensed pressure decreases, the resistance between the rod and the friction material being maintained.

13. The line break detector of claim 12, wherein the difference between the highest sensed pressure and the trip pressure defines a differential pressure, further wherein the rod and cam together move a predetermined distance in the second direction without the valve assembly and shut off valve being activated, the predetermined distance corresponding to the differential pressure.

14. The line break detector of claim 1, the at least one moveable element comprising a first moveable element and a second moveable element, the first and second moveable elements being separated by a friction material, the first moveable element being constructed and arranged to move as the current sensed pressure changes;

wherein the first moveable element moves with respect to the second moveable element, overcoming the resistance of the friction material, to track the highest sensed pressure;

further wherein the second moveable element moves together with the first moveable element, maintaining the resistance of the friction material, to activate the fluid product shut off valve when the current sensed pressure drops below the trip pressure.

15. The line break detector of claim 14, wherein the first moveable element comprises a piston rod.

16. The line break detector of claim 14, wherein the second moveable element comprises a cam, the line break detector further comprising a cam follower operably engaged with the cam to activate the fluid product shut off valve.

17. The line break detector of claim 14, further comprising a valve supported by the second moveable element to activate the fluid product shut off valve.

18. The line break detector of claim 14, wherein the difference between the highest sensed pressure and the trip pressure defines a differential pressures further wherein the second moveable element moves together with the first moveable element for a predetermined distance, the predetermined distance corresponding to the differential pressure.

19. The line break detector of claim 1, wherein the sensor/activator is coupled with the transfer line to sense pressure in the transfer line.

20. A fluid transfer system, comprising:

a supplying vessel, the supplying vessel having an outlet for transferring fluid product from the supplying vessel;

a receiving vessel, the receiving vessel having an inlet for transferring fluid product to the receiving vessel;

a transfer line for transporting a fluid product from the supplying vessel to the receiving vessel, the transfer line being in fluid communication with the supplying vessel and the receiving vessel via the outlet and inlet;

a fluid product shut off valve, the flow of fluid product from the outlet being controlled by the fluid product shut off valve; and a line break detector comprising a sensor/activator, the sensor/activator comprising at least one movable element operably coupled with the transfer line, the sensor/activator being constructed to sense a current pressure of the fluid product, to continually track a highest sensed pressure of the fluid product, and to define a trip pressure, the sensor/activator causing the trip pressure to increase when the highest sensed pressure increases, the sensor/activator being operably coupled to the fluid product shut off valve and being constructed to activate the fluid product shut off valve when the current sensed pressure drops below the trip pressure.

21. The system of claim 20, the at least one moveable element comprising a first moveable element and a second moveable element, the first and second moveable elements being separated by a friction material, the first moveable element being constructed and arranged to move as the current sensed pressure changes;

wherein the first moveable element moves with respect to the second moveable element, overcoming the resistance of the friction material, to track the highest sensed pressure;

further wherein the second moveable element moves together with the first moveable element, maintaining the resistance of the friction material, to activate the fluid product shut off valve when the current sensed pressure drops below the trip pressure.

22. The system of claim 21, in combination with a mobile transport vehicle for transporting the supplying vessel.

23. A line break detector for detecting a break in a transfer line transporting a fluid product from a supplying vessel to a receiving vessel, the supplying vessel having an outlet for transferring fluid product from the supplying vessel, the flow of fluid product from the outlet being controlled by a fluid product shut off valve, the outlet being in fluid communication with the transfer line during transfer of fluid product from the supplying vessel to the receiving vessel, the transfer line being coupled to the receiving vessel for effecting transfer of the fluid product to the receiving vessel, the line break detector comprising a sensor/activator, the sensor/activator being operably couplable to the transfer line, the sensor/activator comprising means for sensing current pressure of the fluid product, means for continually tracking a highest sensed pressure of the fluid product, and means for defining a trip pressure, the sensor/activator causing the trip pressure to increase when the highest sensed pressure increases, the sensor/activator being operably couplable to the fluid product shut off valve and being constructed to activate the fluid product shut off valve when the current sensed pressure drops below the trip pressure.

* * * * *

UNITED STATES PATENT AND TRADEMARK OFFICE
CERTIFICATE OF CORRECTION

PATENT NO.  : 6,012,482
DATED       : January 11, 2000
INVENTOR(S) : Nelson, et al.

It is certified that error appears in the above-identified patent and that said Letters Patent is hereby corrected as shown below:

Col. 9, line 13, replace "110" with --152--.
Col. 9, line 15, after "241" and "238" insert --(Fig. 5)--.
Col. 9, line 16, after "piston" insert --238--.
Col. 9, line 31, replace "existing" with --are--.
Col. 10, line 21, replace "110" with --210--.
Col. 10, line 39, after "Fig. 7" insert --and Fig. 7a--.
Col. 11, line 40, after "206" insert --(Fig. 7)--.
Col. 11, line 41, after "207" insert -- (Fig. 7)--.
Col. 18, line 40, replace "involving" with --moving--.
Col. 18, line 45, replace "claim" with --cam--.
Col. 19, line 35, replace "pressures" with --pressure,--.

Signed and Sealed this

Twelfth Day of December, 2000

Attest:

Attesting Officer

Q. TODD DICKINSON

Director of Patents and Trademarks